United States Patent Office 3,154,557
Patented Oct. 27, 1964

3,154,557
2[ω-(2- AND 4-PYRIDYL)-LOWER-ALKOXY]TETRA-
HYDROPYRANS AND COMPOUNDS PREPARED
THEREFROM
Bernard L. Zenitz, Colonie, N.Y., assignor to Sterling
Drug Inc., New York, N.Y., a corporation of Delaware
No Drawing. Original application Sept. 28, 1959, Ser.
No. 842,562. Divided and this application July 20,
1962, Ser. No. 211,396
4 Claims. (Cl. 260—297)

This invention relates to intermediates useful in the preparation of new piperidyl-lower-alkanoylanilides having the formula

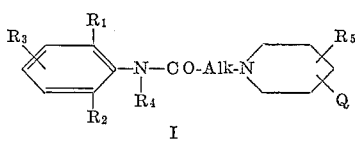

wherein $R_1$ and $R_2$ represent lower-alkyl radicals; each of $R_3$ and $R_4$ represent a hydrogen atom or a lower-alkyl radical; $R_5$ represents a member of the group consisting of a hydrogen atom and from one to four lower-alkyl radicals; Q represents a member of the group consisting of 2- or 4-(hydroxy-lower-alkyl and N,N-di-lower-alkyl carbamyl radicals; and Alk represents a lower-alkylene radical.

More specifically, the compounds of the instant invention are used as intermediates in the preparation of the piperidine moiety of the compounds of general Formula I above where $R_5$ and Q have the meanings given.

When $R_5$ represents one or more lower-alkyl radicals, each lower-alkyl radical can contain from one to about four carbon atoms, can be either straight or branched and can occupy any of the four available positions on the piperidine ring, and when $R_5$ represents more than one lower-alkyl radical, said lower-alkyl radicals can be the same or different. Thus $R_5$ represents, inter alia, methyl, ethyl, isopropyl, n-butyl, isobutyl and the like.

When Q represents a hydroxy-lower-alkyl radical, it can be straight or branched and can contain from one to about six carbon atoms. Q thus stands, inter alia, for hydroxymethyl, 1-hydroxyethyl, 2-hydroxyethyl, 3-hydroxypropyl, 4-hydroxybutyl, 5-hydroxypentyl, 6-hydroxyhexyl and the like.

When Q represents an N,N-di-lower-alkylcarbamyl radical, the lower-alkyl groups of said radical preferably have from one to about four carbon atoms, can be either straight or branched, and can be the same or different. Thus Q also stands, inter alia, for N,N-dimethylcarbamyl, N,N-diethylcarbamyl, N,N-dibutylcarbamyl, N-ethyl-N-methylcarbamyl, and the like.

The compounds of Formula I are prepared by reacting a halo-lower-alkanoylanilide with an appropriate substituted-piperidine as illustrated by the equation given below where $R_1$, $R_2$, $R_3$, $R_4$, $R_5$, Q and Alk have the meanings given above and Hal represents halogen.

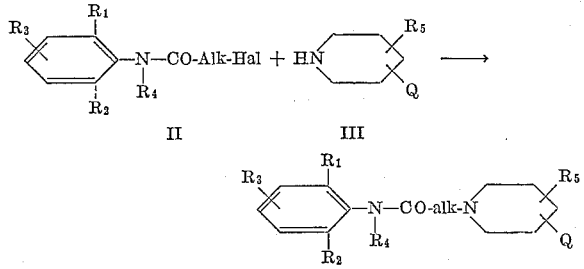

A preferred method comprises heating a substituted-piperidine of Formula III with a halo-lower-alkanoylanilide of Formula II at a temperature in the range from about 50° C. to about 150° C. in the presence of an acid-acceptor. The reaction is preferably carried out in an organic solvent, inert under the conditions of the reaction, such as methanol, ethanol, acetonitrile, benzene, xylene and the like. The purpose of the acid-acceptor is to take up the hydrogen halide which is split out during the course of the reaction. The acid-acceptor is a basic substance which forms water-soluble by-products easily separable from the main product of the reaction, and includes such substances as alkali metal salts of weak acids, i.e. sodium carbonate, potassium carbonate, sodium acetate, or sodium alkoxides. The acid-acceptor can also be in the form of an excess quantity of the substituted-piperidine.

The compounds of Formula III are prepared by reducing the compounds of the instant invention having Formula IV with hydrogen over a catalyst. The reaction is represented by the equation:

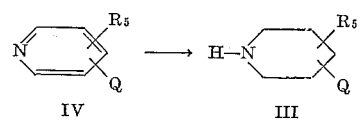

where Q and $R_5$ have the meanings given above. The reaction is carried out under acidic conditions in a solvent inert under the conditions of the reaction, for example methanol, ethanol, or water, at hydrogen pressures in the range from 50–100 p.s.i. A preferred catalyst is platinum oxide, and preferred acidifying agents are acetic acid and hydrochloric acid.

The intermediates of Formula IV where Q is N,N-di-lower-alkylcarbamyl are prepared by reacting a mixed anhydride of a lower-alkyl carbonic acid and a pyridine carboxylic acid with a di-lower-alkylamine. The reaction is represented by the equation:

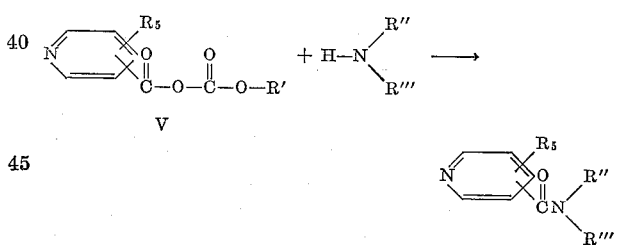

where R′ is lower-alkyl, R″ and R‴ are lower-alkyl, and $R_5$ has the meanings given above. The reaction is carried out in an organic solvent inert under the conditions of the reaction, for example anhydrous acetone, ether, ethylene dichloride, and the like, at a temperature between about −20° C. and about 20° C. A preferred solvent is acetone.

The intermediate mixed anhydrides of the lower-alkyl carbonic and pyridine carboxylic acids of Formula V are in turn prepared by reacting a pyridine carboxylic acid with a lower-alkyl halo-formate in the presence of an acid-acceptor, for example triethylamine, at a temperature between about −20° C. and 20° C. The reaction is carried out in the same solvents used for the reaction of the mixed anhydride with a di-lower-alkylamine. That is, the mixed anhydrides are prepared in situ and reacted directly with the di-lower-alkylamine.

The intermediates of Formula IV where Q is hydroxy-lower-alkyl are prepared by reaction a 2-[ω-(2- or 4-pyridyl)-lower-alkoxy]tetrahydropyran of Formula VI with aqueous mineral acid at a temperature in the range from about 50° C. to 100° C. The reaction is represented by the equation:

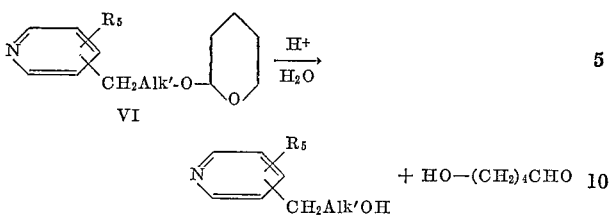

where Alk' is lower-alkylene containing from two to five carbon atoms and $R_5$ has the meanings given above.

The novel compounds of Formula VI are thus useful as intermediates in the preparation of the compounds of Formula III and the former are also considered to be within the purview of the instant invention. The comopunds of Formula VI are in turn prepared by reacting an alkali metal salt of a 2- or 4-methylpyridine with a 2-(ω-halo-lower alkoxy)tetrahydropyran. The reaction is represented by the equation:

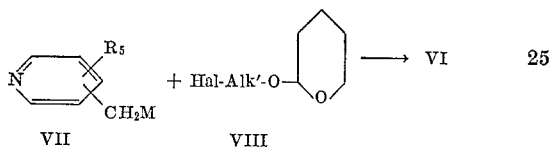

where M is an alkali metal, for example sodium, potassium, or lithium, Hal is a halogen atom, and Alk' and $R_5$ have the meanings give above. The alkali metal salt of the 2- or 4-methylpyridine of Formula VII is prepared by adding the latter to a solution of an alkali metal amide, for example sodamide, in liquid ammonia and the 2-(ω-halo-lower-alkoxy)tetrahydropyran of Formula VIII is then added to the solution of VII.

The structures of the compounds of the invention have been established by chemical analysis and by the processes for their preparation, which can only lead to compounds of the assigned structures.

The following examples will further illustrate the invention, without the latter being limited thereto.

PREPARATION OF INTERMEDIATES

*Example 1*

4-(4-hydroxybutyl) piperidine [III; $R_5$ is H, Q is 4-$(CH_2)_4OH$].—A solution of potassium amide in liquid ammonia was prepared by dissolving 24.6 g. (0.63 mole) of potassium cut into small pieces in 3 liters of liquid ammonia along with about 0.5 g. of ferric chloride. To the resulting solution was added 58.5 g. (0.63 mole) of γ-picoline. The mixture was stirred for ten minutes, treated with 107.5 g. (0.60 mole) of 2-(3-chloropropyloxy)-tetrahydropyran, stirred for an additional five hours, treated with about 2 g. of ammonium chloride and allowed to stand at room temperature overnight. The mixture was then treated with 600 ml. of absolute ether, filtered and the filtrate taken to dryness. The residue was distilled in vacuo over potassium carbonate giving 92.9 g. of 2-[4-(4-pyridyl)-1-butyloxy]tetrahydropyran [VI; $R_5$ is H, Alk' is $(CH_2)_3$], B.P. 103–108° C./0.3 mm.

The 2-[4-(4-pyridyl)-1-butyloxy]tetrahydropyran obtained above (79.4 g., 0.34 mole) was dissolved in a solution of 43 ml. of concentrated hydrochloric acid and 500 ml. of ethanol, and the resulting solution was refluxed for about one hour. The solvent was taken off in vacuo, the residue was dissolved in 250 ml. of water, basified with ammonium hydroxide and extracted with methylene dichloride. The extracts were dried, the solvent removed and the residue distilled in vacuo. The fraction boiling between 87.6° C. and 88.6° C. was collected as 4-(4-hydroxybutyl)-pyridine; $n_D^{25}=1.5238$. It was converted to the hydrochloride salt and the salt recrystallized from an ethanol-ether mixture giving 9.5 g. of 4-(4-hydroxybutyl)pyridine hydrochloride [IV; $R_5$ is H, Q is

4-$(CH_2)_4OH$]

M.P. 156.0–157.6° C. (corr.)

The hydrochloride salt (64 9. g., 0.35 mole) was divided into two approximately equal portions. Each portion was dissolved in 200 ml. of ethanol and reduced separately over 2.0 g. of platinum oxide catalyst under 60 p.s.i. of hydrogen. Reduction in each case was complete in about four hours. The combined mixtures were filtered, evaporated to a volume of about 100 ml., and treated with a solution of 15 g. of sodium hydroxide in 15 ml. of water and then carbonated. The mixture was taken to dryness, extracted with benzene, and the benzene extracts taken to dryness once more. The residue was distilled in vacuo, and the fraction collected at 103–104° C./0.40 mm. was recrystallized from acetone giving 29.3 g. of 4-(4-hydroxbutyl)piperidine, M.P. 57–60° C. (uncorr.).

*Example 2*

4-(5-hydroxypentyl)piperidine [III; $R_5$ is H, Q is 4-$(CH_2)_5OH$] was prepared starting with 86.0 g. (0.925 mole) of γ-picoline and 168.4 g. (0.875 mole) of 2-(4-chlorobutoxy)tetrahydropyran using 36.1 g. (0.925 mole) of potassium and 0.1 g. of ferric chloride in 3 liters of liquid ammonia according to the manipulative procedure described above in Example 1. There was thus obtained 160.9 g. of 2-[5-(4-pyridyl)-1-pentyloxy]tetrahydropyran [VI; $R_5$ is H, Alk' is $(CH_2)_3$], B.P. 112° C./0.05 mm.

Acid hydrolysis of the tetrahydropyranyl ether with dilute acid according to the manipulative procedure described above in Example 1 gave 81.8 g. of 4-(5-hydroxpentyl)-pyridine hydrochloride [IV; $R_5$ is H, Q is 4-$(CH_2)_5OH$]. The free base was obtained by alkaline hydrolysis of the hydrochloride and distillation. There was thus obtained 4-(5-hydropentyl)-pyridine, B.P. 103–105° C./0.09 mm.

Reduction of the latter over a platinum axide catalyst according to the manipulative procedure described above in Example 1 afforded 37.9 g. of 4-(5-hydroxypentyl)-piperidine hydrochloride.

A small amount of the free base converted to the acetate salt gave 4-(5-hydroxpentyl)piperidine acetate, M.P. 97.6–101.0° C. (corr.).

*Example 3*

4-(6-hydroxhexyl)piperidine [III; $R_2$ is H, Q is 4-$(CH_2)_6OH$] was prepared starting with 83.0 g. (0.89 mole) of γ-picoline and 175.2 g. (0.851 mole) of 2-(5-chloropentyloxy)tetrahydropyran using 35.0 g. (0.89 mole) of potassium and 0.1 g. of ferric chloride in 4.5 liters of liquid ammonia according to the manipulative procedure described above in Example 1. There was thus obtained 222.4 g. of crude product which was distilled in vacuo giving 175.2 g. of 2-[6-(4-pyridyl)-1-hexyloxy]-tetrahydropyran [VI; $R_5$ is H, Alk' is $(CH_2)_5$], B.P. 120–124° C./0.065 mm.

Acid hydrolysis of the tetrahydropyranyl ether (213.2 g., 0.81 mole) with dilute acid according to the manipulative procedure described above in Example 1, and distillation of the product in vacuo gave 98.2 g. of 4-(6-hydroxyhexyl)pyridine [IV; $R_5$ is H, Q is

4-$(CH_2)_6OH$]

B.P. 111–115° C./0.10 mm.

Reduction of 71.6 g. (0.40 mole) of the latter over platinum oxide catalyst according to the manipulative procedure described above in Example 1 and recrystallization of the product as the acetate salt from an isopropanol-acetone mixture gave 79.6 g.of 4-(6-hydroxyhexyl)-piperidine acetate, M.P. 104.4–107.2° C. (corr.).

Example 4

4-(N,N-dimethylcarbamyl)piperidine [III; $R_5$ is H, Q is 4-CON(CH$_3$)$_2$].—To a cold solution (—10° C.) containing 24.6 g. (0.20 mole) of isonicotinic acid and 20.5 g. (0.20 mole) of triethylamine in 500 ml. of acetone was added 23.9 g. (0.22 mole) of ethyl chlorocarbonate. The solution was stirred at —10 to —15° C. for twenty minutes and then treated with a solution containing 13.5 g. (0.30 mole) of dimethylamine in acetone. The mixture was stirred at room temperature for two and a half hours and then filtered. The filtrate was taken to dryness and the residue taken into benzene and washed with a saturated potassium carbonate solution. The organic layer was dried, evaporated and distilled in vacuo. The sample boiling at around 113° C./1.5 mm. was collected and recrystallized once from ethyl acetate and once from a benzene-hexane mixture giving 3.5 g. of 4-(N,N-dimethylcarbamyl)pyridine [IV; $R_5$ is H, Q is 4-CON(CH$_3$)$_2$], M.P. 57.4–60.6° C. (corr.).

4 - (N,N - dimethylcarbamyl)pyridine (77.7 g., 0.52 mole) dissolved in a solution containing 34 g. of glacial acetic acid in 600 ml. of water was reduced in three portions over 1.0 g. of platinum oxide under 60 p.s.i. of hydrogen according to the manipulative procedure described above in Example 1. The product was isolated as the free base and recrystallized once from an ethyl acetate-hexane mixture and once from hexane alone giving 50.3 g. of 4-(N,N-dimethylcarbamyl)piperidine. M.P. 64.2–68.2° C. (corr.).

Example 5

4-(N,N-diethylcarbamyl)piperidine [III; $R_5$ is H, Q is 4-CON(C$_2$H$_5$)$_2$] was prepared from 35.6 g (0.20 mole) of 4-(N,N-diethylcarbamyl)-pyridine according to the manipulative procedure described above in Example 4. The product was purified by distillation to give 15.8 g. of 4-(N,N-diethylcarbamyl)piperidine, B.P. 87.5–88.5° C./0.21 mm.

PREPARATION OF FINAL PRODUCTS

Example 6

α - {1 - [4 - (4 - hydroxybutyl)piperidyl]} - 2,6 - dimethylacetanilide [I; $R_1$ and $R_2$ are CH$_3$, $R_3$, $R_4$, and $R_5$ are H, Q is 4-(CH$_2$)$_4$OH, Alk is CH$_2$].—A mixture of 3.95 g. (0.02 mole) of α-chloro-2,6-dimethylacetanilide, 3.46 g. (0.02 mole) of 4-(4-hydroxybutyl)-piperidine, 6.36 g. (0.06 mole) of anhydrous sodium carbonate, and 200 ml. of absolute ethanol was heated under reflux for about sixteen hours, filtered and the filter washed with absolute ethanol. The combined filtrate was taken to dryness, the residual oily mass dissolved in 10% acetic acid, filtered and the filtrate basified with saturated potassium carbonate. A heavy oil separated which solidified on standing for several hours. It was collected, and recrystallized from an ethyl acetate-hexane mixture giving 4.3 g. of α-{1-[4-(4-hydroxybutyl)piperidyl]}-2,6-dimethylacetanilide, M.P. 101–102.8° C. (corr.).

Examples 7–28

By following the manipulative procedure described above in Example 6, substituting for the reactants used therein an appropriate halo-lower-alkanoylanilide and an appropriate substituted-piperidine, there were obtained the compounds of formula I listed below in Table I, where $R_1$ and $R_2$ in each example is CH$_3$, and $R_4$ in each example is hydrogen. The melting points are corrected unless noted otherwise, and the numerals preceding the functional groups in the columns headed $R_3$, $R_5$ and Q designate the position of the group on the phenyl ring or the piperidine ring as the case may be.

TABLE I

| Example | $R_3/R_5$ | Q/Alk | M.P.(° C.) |
|---|---|---|---|
| 7 | H / H | 4-(CH$_2$)$_3$OH / CH$_2$ | 80.0–83.6 |
| 8 | H / H | 4-(CH$_2$)$_5$OH / CH$_2$ | 69.2–71.0 |
| 9 | H / H | 4-(CH$_2$)$_3$OH / CH$_2$CH$_2$ | 91.8-8–93.2 |
| 10 | H / H | 4-(CH$_2$)$_5$OH / CH$_2$CH$_2$ | 114.6–116.4 |
| 11 | H / H | 4-(CH$_2$)$_6$OH / CH$_2$CH$_2$ | 110.0–111.0 |
| 12 | H / H | 4-(CH$_2$)$_4$OH / CHCH$_3$ | 72.8–75.2 |
| 13 | H / H | 4-(CH$_2$)$_5$OH / CHCH$_3$ | 62.2–66.4 |
| 14 | H / H | 4-(CH$_2$)$_6$OH / CHCH$_3$ | 80.2–84.4 |
| 15 | CH$_3$ / H | 4-(CH$_2$)$_4$OH / CH$_2$ | 81.0–82.2 |
| 16 | CH$_3$ / H | 4-(CH$_2$)$_5$OH / CH$_2$ | 124.6–126.2 |
| 17 | CH$_3$ / H | 4-(CH$_2$)$_6$OH / CH$_2$ | 94.0–96.2 |
| 18 | CH$_3$ / H | 4-(CH$_2$)$_4$OH / CH$_2$CH$_2$ | 75.4–80.4 |
| 19 | CH$_3$ / H | 4-(CH$_2$)$_5$OH / CH$_2$CH$_2$ | 92.0–93.8 |
| 20 | CH$_3$ / H | 4-(CH$_2$)$_6$OH / CH$_2$CH$_2$ | 100.8–102.0 |
| 21 | CH$_3$ / H | 4-(CH$_2$)$_4$OH / CHCH$_3$ | 109.4–111.6 |
| 22 | CH$_3$ / H | 4-(CH$_2$)$_5$OH / CHCH$_3$ | 93.0–95.2 |
| 23 | CH$_3$ / H | 4-(CH$_2$)$_6$OH / CHCH$_3$ | 84.4–86.2 |
| 24 | H / H | 4-CON(CH$_3$)$_2$ / CH$_2$ | 135.6–139.0 |
| 25 | H / H | 4-CON(C$_2$H$_5$)$_2$ / CH$_2$ | 112.6–115.2 |
| 26 | H / H | 4-CON(CH$_3$)$_2$ / CH$_2$CH$_2$ | 141.4–144.0 |
| 27 | H / H | 4-CON(C$_2$H$_5$)$_2$ / CH$_2$CH$_2$ | 107.4–109.2 |
| 28 | CH$_3$ / H | 4-CON(C$_2$H$_5$)$_2$ / CH$_2$ | 73.8–75.4 |

The compounds of Formula I have pharmacodynamic properties, in particular, local anesthetic and anticonvulsant activities.

This application is a division of my co-pending United States patent application Serial No. 842,562, filed September 28, 1959, now U.S. Patent 3,124,586 (Patented March 10, 1964).

I claim:
1. A compound of the formula

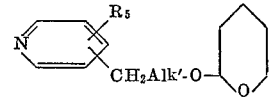

wherein $R_5$ represents a member of the group consisting of a hydrogen atom and from one to four lower-alkyls of from one to four carbon atoms, Alk' represents lower-alkylene of from two to five carbon atoms, and wherein the

chain is attached to one of the 2– and 4–positions of the pyridine ring.

2. 2-[4-(4-pyridyl)-1-butyloxy]tetrahydropyran.
3. 2-[5-(4-pyridyl)-1-pentyloxy]tetrahydropyran.
4. 2-[6-(4-pyridyl)-1-hexyloxy]tetrahydropyran.

References Cited in the file of this patent

UNITED STATES PATENTS

| 2,735,851 | Cislak | Feb. 21, 1956 |
| 2,789,982 | Cislak | Apr. 23, 1957 |
| 2,807,619 | Cislak | Sept. 24, 1957 |

OTHER REFERENCES

Meltzer et al.: JACS, Vol. 77, pp. 4062–6 (1955).

UNITED STATES PATENT OFFICE
CERTIFICATE OF CORRECTION

Patent No. 3,154,557                   October 27, 1964

Bernard L. Zenitz

It is hereby certified that error appears in the above numbered patent requiring correction and that the said Letters Patent should read as corrected below.

Column 2, line 69, for "reaction" read -- reacting --; column 3, line 32, for "give" read -- given --; column 4, line 6, for "649. g." read -- 64.9 g. --; line 40, for "axide" read -- oxide --; same column 4, line 49, for "4-(6-hydroxhexyl)-piperidine [III; R$_2$" read -- 4-(6-hydroxyhexyl)piperidine [III; R$_5$ --; column 5, line 4, for "(CH$_3$)$_2$." read -- (CH$_3$)$_2$]. --;

line 29, for "4-(N,N-dimethylcarbamyl)pyridine" read -- 4-(N,N-dimethylcarbamyl)piperidine --; column 6, TABLE I, fourth column, line 3 thereof, for "91.8-8-93.2" read -- 91.8-93.2 --.

Signed and sealed this 1st day of June 1965.

(SEAL)
Attest:

ERNEST W. SWIDER

Attesting Officer

EDWARD J. BRENNER

Commissioner of Patents